United States Patent [19]

Lamaze

[11] 4,200,612

[45] Apr. 29, 1980

[54] PROCESS FOR RECOVERING ACIDS AND ZIRCONIUM CONTAINED IN PICKLING SOLUTIONS

[75] Inventor: Airy P. Lamaze, Ugine, France

[73] Assignee: Ugine Aciers, Paris, France

[21] Appl. No.: 958,491

[22] Filed: Nov. 7, 1978

[30] Foreign Application Priority Data

Nov. 29, 1977 [FR] France .................. 77 36627

[51] Int. Cl.$^2$ ............................................. C01G 25/00
[52] U.S. Cl. ..................... 423/70; 210/37 B; 423/82
[58] Field of Search ............ 423/70, DIG. 14; 210/37 B; 75/101 BE

[56] References Cited

U.S. PATENT DOCUMENTS

2,567,661  9/1951  Cyres ......................... 423/70

FOREIGN PATENT DOCUMENTS

672649  3/1966  Belgium ...................... 423/70

OTHER PUBLICATIONS

Danielsson, "Acta Cehemica Scandinavica", vol. 19, 1965, pp. 1859-1874.
Kim et al., "J. of Inorganic & Nuclear Chem.", vol. 33, 1971, pp. 3547-3555.

Primary Examiner—Herbert T. Carter
Attorney, Agent, or Firm—Dennison, Dennison, Meserole and Pollack

[57] ABSTRACT

A process for recovery of zirconium from pickling solutions which have been used to treat products formed of zirconium or zirconium-based alloys, the invention particularly provides for separating zirconium from the acids contained in such solutions. The present process comprises passing the used or spent pickling solutions which contain from 1 to 50 g/l of dissolved zirconium through a column of an anionic ion-exchange resin by means of which the zirconium ions are separated from fluoride and nitrate ions originally present in the pickling solutions. Approximately 90% of the zirconium contained in such solutions can be recovered according to the invention, it being further possible to recycle residual fluoride and nitrate ions which remain in the used pickling solutions.

8 Claims, No Drawings

PROCESS FOR RECOVERING ACIDS AND ZIRCONIUM CONTAINED IN PICKLING SOLUTIONS

BACKGROUND OF THE INVENTION

1. Field of the Invention

The invention generally relates to recovery of catonic and anionic values from used or spent pickling solutions used in the treatment of products formed of certain metals and metal alloys. In particular, the invention concerns the recovery of zirconium from acidic pickling solutions, residual fluoride and nitrate ions also being recovered for recycle.

2. Description of the Prior Art

The conversion of ingots of zirconium and zirconium alloys to finished products necessitates a very high level of care to ensure that surface defects, which may possibly occur during each of the stages of the conversion operation, do not create problems during subsequent stages of said operation which could cause the finished products to be rejected. Such care is justified not only due to the high cost of the raw materials which must be subjected to expensive purification and reduction treatments, but also because of extremely strict specifications which must be set by the nuclear industry regarding materials, structural members and combustible elements, the zirconium products so treated being typically used as structural or sheathing materials for nuclear reactors. For all these reasons, pickling treatments are carried out on zirconium or zirconium alloy products at various stages in the production operations. Most generally, such pickling treatments are carried out in aqueous solutions which simultaneously contain nitric acid and hydrofluoric acid. The concentration of these acids varies but is generally of the order of from 2 to 5 N for nitric acid and from 0.5 to 2 N for hydrofluoric acid. Upon coming into contact with zirconium and its alloys, such pickling solutions gradually become charged with zirconium and various metals, mainly metals of addition, while their pH-values decrease. Experience has shown that the pickling speed decreases in proportion to an increase in the concentration in respect to dissolved zirconium and that, beyond a certain threshold, it is found that particles of solid phases appear, such particles having a tendency to precipitate. Introducing fresh amounts of HF and $HNO_3$ only delays this precipitation phenomenon but does not suppress it.

In practice, it is necessary to remove the pickling solutions as soon as their dissolved zirconium content substantially exceeds 25 g/liter. Ths requirement results in the dumping of large amounts of the solutions, which solutions have a high fluoride and nitrate ion content, while also containing relatively substantial amounts of zirconium. Dumping these solutions represents substantial wastage of zirconium and acids and is also a cause of pollution. The amounts of zirconium or zirconium-based alloys which are wasted increase as the stage at which the pickling treatments are carried out approaches the final state in which the product is most frequently in the form of tubes or sheets of small thickness with a high surface-to-volume ratio. The loss of weight in the course of a single pickling operation can then reach 5% or more.

The process which is the subject of this invention makes it possible simultaneously to reduce the consumption of fluoride and nitrate ions in the pickling process by the order of 80% or more and to recover the major part of the zirconium ions which have been dissolved. The process makes it possible largely to replace the consumption of nitric and hydrofluoric acids by the consumption of less expensive sulfuric and hydrochloric acids. Finally, the process makes it possible to provide a neat solution to a delicate problem of treating effluents to prevent pollution.

3. Summary of the Invention

The present invention concerns the treatment of effluents from acid pickling of half-finished and finished products of zirconium or zirconium-based alloys in order to recover the zirconium contained in the effluents and to recycle residual anions contained therein. More precisely, the process which is the subject of this invention provides for selective extraction of zirconium from the pickling solutions and recycling of the major part of the fluoride and nitrate ions contained in such solutions, which provides for a saving in cost and considerably reduces the dangers of pollution by the discharge of spent acid solutions. The process is applied in particular to treatment of solutions for pickling zirconium and zirconium alloys which are used as structural or sheathing materials in nuclear reactors. The process then makes it possible to recover the zirconium, generally in the form of an oxide of nuclear purity, which can be re-used directly in the cycle for producing the metal.

In a typical practice of the process which is the subject of the present invention, the used or spent nitrohydrofluoric pickling solution containing zirconium and possibly other metals in a dissolved state is passed through a column containing a suitably selected anionic ion-exchange resin which has been previously subjected to a suitable treatment. It is then found that, under given operating conditions, it is possible at the outlet from this column to achieve separation of zirconium from the fluoride and nitrate ions contained in the solution. Hydrofluoric acid is regenerated from the fluoride ions which were combined with the zirconium in the spent solution while zirconium is recovered initially in the form of a sulfate solution.

DESCRIPTION OF THE PREFERRED EMBODIMENTS

Spent pickling solutions treated according to the present process are aqueous and typically fall within the following composition range:

$HNO_3$ concentration: 2 to 5 N
HF concentration: 0.5 to 2 N
Zr concentration: 1 to 50 g/l In actual practice, it is preferable to ensure that no colloidal suspension of zirconium compounds is present in the solution. Such suspensions tend to form at zirconium contents of higher than about 25 or 30 g/l. Otherwise, it is advantageous to treat solutions which already contain relatively substantial amounts of zirconium in solution, or the order of from 10 to 25 g/l. In the case of solutions in which it has not been possible to prevent the formation of zirconium compounds in the colloidal state, the treatment remains possible, provided that the colloids are previously separated as by centrifuging.

According to a general practice of the invention, a variety of anionic resins can be used. Good results are achieved with moderately bridged resins of the quaternary ammonium type such as the resin DOWEX 1 - ×10 produced by Dow Chemical Company. It is also possible to use resins DOWEX 2 or AG 1 or 2 produced by the same manufacturer, with bridging rates ×8 or ×10.

In a first stage, the selected resin contained in a column whose dimensions will depend on the amounts to be treated is saturated with sulfate ions, if it has not already been so saturated initially, by means of a sulfuric acid solution which may be of normal concentration. Distilled water is then used to rinse the column to remove excess sulfuric acid contained in the column. Treatment of the spent or used pickling solution then comprises the followng steps:

(1) The solution containing from about 10 to 25 g/l of zirconium in solution is introduced into the column, the $HNO_3$ and HF concentrations being in the ranges given hereinbefore. The operation of introducing the pickling solution is continued until a condition of saturation by volume of the column is reached, that is to say, until very small amounts of fluoride and nitrate ions appear at the outlet of the column.

(2) A hydrochloric acid solution, for example of normal concentration, is then introduced instead of the pickling solution. Simultaneously, it is observed that a solution of nitric and hydrofluoric acids is discharged at the other end of the column, which acid solution contains virtually no zirconium and is recovered for re-use for pickling zirconium products. It is observed that zirconium begins to be present in the solution at the moment that the last amounts of $HNO_3$ and HF are discharged from the column.

(3) With the step of introducing normal hydrochloric acid into the column being continued, it is observed after a fairly short period of time that the solution which is discharged at the other end of the column now contains only traces of $HNO_3$ or HF, but now contains zirconium in a sulfuric solution. The resulting solution can then be treated to extract the zirconium therefrom. For example, this zirconium may be precipitated in the form of oxide by ammonia, the oxide then being converted in a known manner to zirconium chloride which will then be reduced, also in a known manner, in the form of metal zirconium.

(4) An aqueous solution of sulfuric acid, for example of normal concentration, is then introduced into the column, and it is observed that an aqueous solution of hydrochloric acid issues from the column, which solution is recovered for re-use. The step of introducing the sulfuric solution is continued until virtually all the chloride ions are removed and a small amount of sulfate ions appears in the solution issuing from the column. The column is then rinsed with distilled water to return the column to its initial condition, it then being possible to resume treatment within the column of another bath of spent pickling solution by following the step-wise cycle described above.

It is found that carrying out the process makes it possible finally to recover in a sulfuric solution the zirconium which was present in the spent pickling solution. It can be seen that theoretically, only the amount of sulfuric acid necessary for converting the zirconium to sulfate is consumed. In principle, the hydrochloric acid is fully recovered. In practice, this is obviously not the case and it is not possible to avoid the formation of mixtures which are produced by diffusion of the reagents through each other. Thus, if the presence of sulfate in the recovered pickling bath is to be avoided, and if the presence of fluorine ions in the zirconium sulfate solution is also to be avoided, it is necessary to set aside close to 10% of the zirconium initially contained in the pickling solution, which portion of the zirconium is eluted from the column in the transition zone between the second and third steps of the process. The portion which is thus set aside contains both fluoride and sulfate. It is possible to envision storing this portion and subsequently re-treating it by means of the present process.

As regards the amounts of hydrochloric acid used in the course of the second and third steps of the process, it will be readily understood that the essential purpose of this acid is to substitute chloride anions in the column for the anions which were fixed in the column when the pickling solution was introduced, thereby to permit recovery of the anions which were fixed in the column as described above. The chloride anions will subsequently be themselves replaced by sulfate anions when sulfuric acid is introduced. It is therefore not necessary for the column to be completely filled with a solution of hydrochloric acid, but it is sufficient for the amount introduced to be such as to provide for the existence in the column of a mobile transition zone in which the fixed anions are virtually only chloride. The same reasoning applies to introducing the solution of sulfuric acid. It is not necessary for the column to be filled with this solution, but only that a sufficient amount of this solution is introduced into the column to ensure that there is in the column a mobile transition zone between the zone containing the chloride ions which it displaces before it to the outlet from the column and the rinsing water which will be introduced behind it.

Use of the process according to the invention for treating a small amount of pickling solution will be described hereinafter by way of example.

EXAMPLE

An ion-exchange column which is 80 cm in length and 10 cm in inside diameter and filled with DOWEX AG 1×10 is used. This column is first treated by passing therethrough a normal sulfuric acid solution in order to saturate the column with sulfate anions. The column is then rinsed with distilled water. One liter of a used aqueous pickling solution of the following composition is then passed through the column at a speed of 2 l/hr, this used solution beng now referred to as solution A:

$HNO_3$ in a concentration of 2.7 N
HF in a concentration of 0.8 N
Zr in a concentration of 25 g/l
The following eluting agents are then introduced into the column successively after the pickling solution at the same speed of 2 l/hr, the respective solutions being referred to as follows:
(B) 0.5 l of HCl in 1 N solution;
(C) 0.5 l of $H_2SO_4$ in 1 N solution; and,
(D) 5 l of $H_2O$ to perform the rinsing step.
Introduction of the aforesaid used aqueous pickling solution results in the respective elutions of the following fraction, which fractions are sequentially taken from the outlet end of the column in the following volumetric amounts as the solutions A through D are introduced into and passed through the column:
(1) 0.9 l of nitro-hydrofluoric pickling solution in which the dissolved Zr concentration is less than 0.05 g/l.
(2) 0.2 l of solution containing Zr in the form of sulfate
(3) 0.3 l of HCl in 1 N solution (4) 0.2 l of acid solution containing a mixture of HCl and $H_2SO_4$ (5) 0.3 l of $H_2SO_4$ in 1 N solution (6) 5 l of water containing small amounts of $H_2SO_4$ A volume of water corresponding to the free volume of the column is, of course, obtained prior to passage of the 0.9 l solution of nitro-hydrofluoric pickling solution.

The foregoing Example clearly shows how separation of zirconium from the spent pickling solution is effected. Solution (2), which contains zirconium in sulfate form, can then easily be treated to recover the zirconium by known methods, such recovery typically being most readily accomplished in the oxide form. The example described above can easily be extrapolated to an industrial scale. Using a plurality of columns in parallel allows the process to be performed continuously, the dimensions of the columns being readily adapted to the amounts which are to be treated. It should be observed that metals other than zirconium, in particular addition metals used in zirconium-based alloys such as tin, chromium, iron and nickel, are not separated in the ion-exchange column from the pickling solution. A certain increase in the content of such metals in the pickling solution is therefore observed in the course of time. However, this is not a serious disadvantage and in practice, this increase stabilizes at an acceptable level, taking into account the inevitable losses of pickling solutions. The zirconium recovered has the further advantage of being very pure, which makes it suitable for all types of uses, in particular, nuclear use.

What is claimed is:

1. A process for recovering zirconium values from a pickling solution containing fluoride and nitrate ions, comprising the steps of:

preparing an anionic ion exchange resin in a column with a sulfuric acid solution in order to saturate the resin with sulfate ions;

contacting the resin thus prepared with a used pickling solution containing zirconium in a concentration of less than 50 grams per liter of solution and also containing fluoride and nitrate ions, the zirconium being absorbed by the resin; and, passing a hydrochloric acid solution through the column to replace the used pickling solution containing fluoride and nitrate ions and, on volumetric displacement of the used pickling solution, continuing to pass the hydrochloric acid solution through the column to elute zirconium from the column in a sulfate solution separately from the replaced used pickling solution.

2. The process of claim 1 wherein the preparing step comprises:

passing a sulfuric acid solution through the column; and, rinsing the column with distilled water to remove excess sulfuric acid.

3. The process of claim 2 wherein the sulfuric acid solution is approximately 1 N.

4. The process of claim 1 wherein nitrate ion is present in the used pickling solution in the acid form in a concentration of between 2 and 5 N and wherein the fluoride ion is present in the used pickling solution in the acid form in a concentration of between 0.5 and 2 N.

5. The process of claim 1 wherein zirconium is present in the used pickling solution in a concentration of less than 25 g/l.

6. The process of claim 1 wherein zirconium is present in the used pickling solution in a concentration greater than 1.0 g/l.

7. The process of claim 1 wherein the hydrochloric acid solution is approximately 1 N.

8. The process of claim 1 wherein the used pickling solution is passed through the column at a rate of approximately 2 liters per hour.

* * * * *